United States Patent [19]
Rosenberger

[11] Patent Number: 5,424,712
[45] Date of Patent: Jun. 13, 1995

[54] CARJACKING DEFENSE SYSTEM

[76] Inventor: Ronald J. Rosenberger, 506 Sterling St., Newtown, Pa. 18940

[21] Appl. No.: 165,680

[22] Filed: Dec. 13, 1993

[51] Int. Cl.$^6$ .............................................. B60R 25/10
[52] U.S. Cl. ................................. 340/426; 340/425.5; 340/428; 340/541
[58] Field of Search ...................... 340/426, 425.5, 428, 340/541; 116/214; 307/10.2, 10.3; 180/287

[56] References Cited

U.S. PATENT DOCUMENTS

| | | | |
|---|---|---|---|
| 3,259,050 | 7/1966 | Grimm III | 98/2 |
| 3,656,658 | 4/1972 | Iannetti | 222/5 |
| 4,055,277 | 10/1977 | Fegley et al. | 222/180 |
| 4,068,780 | 1/1978 | Fegley | 109/20 |
| 4,570,824 | 2/1986 | Bolling | 222/39 |
| 4,841,752 | 6/1989 | Fletcher | 109/20 |
| 4,958,142 | 9/1990 | Sayers | 340/426 |
| 5,046,449 | 9/1991 | Nelson | 118/325 |
| 5,280,268 | 1/1994 | Matthews | 340/428 |

*Primary Examiner*—Donnie L. Crosland
*Attorney, Agent, or Firm*—Abdallah & Muckelroy

[57] ABSTRACT

A motor vehicle carjacking defense apparatus comprises a double pole switch which actuates at least one solenoid controlling at least one valve which interconnects a nozzle to a pump connected to a pressurized tank containing a non-toxic and non-corrosive irritant. The switch also overrides the vehicles electric window system, the alarm system, and the air flow system simultaneously sealing the windows and the air flow system and energizing the alarm system. Alternatively, the switch located inside the vehicle actuates an infrared heat detector connected to said solenoid wherein upon actuation of the detector, the detector energizes the solenoid from an electrical power supply. A plurality of nozzles and infrared heat detectors are arrayed around the vehicle whereby when the detector is armed it detects the presence of a carjacker and causes a spray of a pressurized, non-toxic and non-corrosive irritant and smoke towards the would-be carjacker. A secondary circuit may be activated so as to cause a siren or loudspeaker or the car horn to emit a high-pitched sound.

9 Claims, 2 Drawing Sheets

CARJACKING DEFENSE SYSTEM

TECHNICAL FIELD

This invention relates to vehicle theft deterrents, and particularly to carjacking defense systems actuated by an occupant of the vehicle, and more particularly to an addition or adjunct to an existing vehicle anti-theft alarm system, automatic power door lock system, air conditioning system, and electrically powered window system capable of sensing the presence of a carjacker, exercising an overriding control of these systems and emit a smokescreen and non-lethal irritant selectively towards the carjacker.

BACKGROUND OF THE INVENTION

Motor vehicle theft by means of carjacking while the driver is operating a vehicle is an ever-growing problem today and one which results not only in considerable cost and dismay to a stolen vehicle's owner but oftentimes the wounding or intentional murder of the driver by the carjacker. Carjacking has become an ever present lethal threat in American society today. The purpose of the novel system is to protect the life of each occupant of a motor vehicle when threatened by an attempted carjacking. Its purpose, structure and function are different from the prior art which is directly primarily to the protection of personal property from theft.

Various devices and systems using discomfort-causing substances have been proposed, one such being disclosed, for example, in the specification relating to PCT Application No. PCT/FR85/00244 of Sep. 10, 1985. In this document, a device using an existing wind screen washer element or elements of a motor vehicle to generate sprays or showers of "chemical liquids such as ammonia, sulfuric acid, and hydrochloric acid, and dyes" is installed in a vehicle, apparently with the aim of "marking, hurting, asphyxiating" a would be thief but without regard to adapting same to defend against a carjacker. Another such vehicle theft deterrent system actuatable in response to a timer is disclosed in U.S. Pat. No. 4,958,142 issued to Sayers on Sep. 18, 1990. This system is also not adapted to defend against a carjacker.

A vehicle conduit system for selectively spraying a fluid was introduced in U.S. Pat. No. 3,259,050 issued to Grimm in 1966. An intrusion protection system wherein a tear gas gun is mechanically maintained in a normally cocked position with a electrical resistor connected at one end to a firing pin while the opposite end of the resistor is secured to a stationary surface was proposed in U.S. Pat. No. 3,656,658 issued to Iannnetti in 1972. In essence, the system is an electrically controlled tear gas discharger. In 1977 U.S. Pat. No. 4,055,277 was issued to Fegley et al for a type of fluid dispensing anti-burglary device wherein pressurized fluid such as tear gas is discharged when an unauthorized movement of an object is attempted. This anti-burglary device employs a security cable which will allow limited movement of the object but will cause release of the pressurized fluid when the security cable is severed or removed from its terminations. Fegley was also issued U.S. Pat. No. 4,068,780 in 1978 for an electrothermally activated fluid dispensing device. The device employs an electrothermal actuator strip for causing fluid discharge when an electric current flows through it.

In U.S. Pat. No. 4,570,824 issued to Bolling in 1986 an electrical doorbell activated mechanism was disclosed or dispensing an aerosal spray inside a home. In contrast in 1989 U.S. Pat. No. 4,841,752 was issued to Fletcher for an array of spray nozzles selectively controlled by footpedal for operation as an anti-theft device.

In 1991 U.S. Pat. No. 5,046,449 was issued to Nelson for an outward spray apparatus for coating the front of a vehicle wherein a pump is coupled to a reservoir for pumping the liquid from the reservoir and a dispensing tube is connected from the pump for dispensing the material from the reservoir for spraying over the front of a vehicle.

SUMMARY OF THE INVENTION

The principal object of the present invention is to provide a carjacking defense system about the periphery of a motor vehicle upon actuation of a double pole two-way electrical switch for selectively projecting a novel defensive spray onto a carjacker outside a threatened vehicle with the capability to also alternatively non-selectively dispense the defensive spray by actuation of the switch to a different pole thereof. The carjacking defense apparatus comprises a pressurized tank filled with a discomfort causing substance and a dense smoking producing material, a valve for selectively releasing said substance and said material, a distribution nozzle means, a solenoid operatively connected for actuating the valve for a distribution nozzle means, an infrared heat sensor means located adjacent each valve distribution nozzle means connected to the solenoid and adapted to actuate the solenoid upon detecting a change in the ambient infrared heat and to actuate an audible high decibel alarm operatively connected for actuation by the solenoid. In addition, the system comprises a switching means for energizing the solenoid to open the valve for release of the smoke and discomfort causing substance while simultaneously energizing the pumping of the substance and smoke material through the valves to the nozzles. In the second position the switching means activates infrared heat sensors which when activated at a preselected preset threshold energizes only an adjacent solenoid which in turn switches power to the pump and opens the valves adjacent the nozzles to release the substance and smoke material in the vicinity of the actuated infrared heat sensor. The selective position whereby only a particular valve is opened by a thermal sensor conserves fluid in the tank reservoir and extends the operable time period of the defensive system so as to meet multiple threats from different directions occurring at different time intervals.

OBJECTS OF THE INVENTION

Thus, a primary object of the invention is to provide a carjacking defense system which alternatively activates a battery of infrared heat sensor which surrounds the exterior of the vehicle each having adjacent thereto a nozzle capable of releasing a discomfort causing fluid or gas and smoke upon sensing presence of a hostile intruder by means of the infrared heat emitted by body of the intruder.

According to the present invention it is further object that the vehicle be marked or tagged in some manner to indicate that the motor vehicle is equipped with the novel anti-carjacking defense system to deter potential carjackers from attempting to approach the motor vehicle.

Further, it is the object of the present invention to provide a system arrangement for selective engagement of the system whereby using infrared heat sensors or the like the dispensation of discomfort causing fluid and smoke is conserved and limited to the area of the vehicle approached by the forewarned carjacker or intruder.

The carjacking defense system of the present invention may be utilized in combination with either a warning means, for example, a light on the vehicle of a particular color or an actual voice warning system warning that if an intruder approaches within, for example, a certain distance from the vehicle they are subject to disablement or other appropriate deterrent measures. In this manner the system is used in the infrared heat sensor mode to detect the presence of an intruder within a certain range of the vehicle. The infrared heat sensors threshold can be set to be activated upon the approach of the intruder within a specified range or distance from the vehicle. Alternatively, the present invention offers the occupant of the vehicle the capacity to completely enable the system and immediately cause the dispensation of the discomfort causing fluid and smoke in response to an actual attack.

Other objects, aspects and advantages of the invention have become apparent from the following description taken in connection with the accompanying drawings, to wit:

DESCRIPTION OF THE PREFERRED EMBODIMENT

As it is unlawful to injure seriously even a potential carjacker, as with corrosive acids, and wherein,in carjacking situations where serious bodily harm is probable if the carjacker gains entry into the vehicle, it is an object of the present invention to overcome the above and other disadvantages by the provision of a motor vehicle carjacking defense apparatus and deterrence system which may comprise a warning light or other indicator that the system engaged, a double pole switch which actuates at least one solenoid controlling at least one valve which interconnects a nozzle to a pump connected to a pressurized tank containing a non-toxic and non-corrosive irritant. The switch also overrides the vehicles electric window system, the alarm system, and the air flow system simultaneously sealing the windows, the air flow system, and energizies the alarm system. Alternatively, the switch located inside the vehicle actuates a system engagement warning system or means and an infrared heat detector connected to said solenoid wherein upon actuation of the detector, the detector energizes the solenoid from an electrical power supply. A plurality of nozzles and infrared heat detectors are arrayed around the vehicle whereby when the detector is armed it detects the presence of a carjacker and causes a spray of a pressurized, non-toxic and non-corrosive irritant and smoke towards the would-be carjacker. A secondary circuit may be activated so as to cause a siren or loudspeaker or the car horn to emit a high pitched sound.

Figure 1:
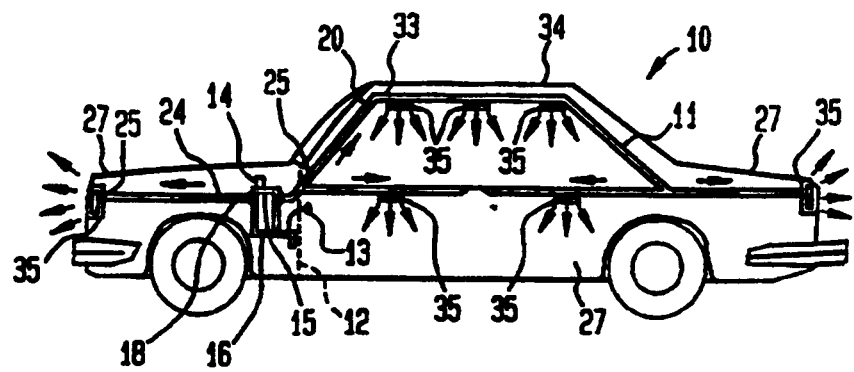
FIG. 1 is a diagramatic view showing a preferred embodiment of the invention as applied to a conventional passenger automobile or motor vehicle.

Referring to FIG. 1, the invention as shown is incorporated into an automobile body 10 of more or less conventional design. On the from of the dashboard indicated at 12 in FIG. 1 is secured a switch 13 of the double pole, two position variety which is simultaneously electrically connectable to a warning system 13a (shown schematically in FIG. 2) and a pump 14. The pump 14 is connected to a pressurized container 15. The pressurized container contains discomfort causing substance as well as a smoke producing material which the pump 14 is capable of pumping from the interior 16 of the pressurized container 15 via pipes 18 to 20 to valves and nozzles located at various locations about the automobile body 11. Electrical wiring 24 and 25 also extends in conduits attached along the length of the pipes 18 and 20, respectively. Electrical wiring 24 and 25 interconnects the switch 13 to individual solenoid, infrared heat sensors and valves located in modules 35 dispersed around the automobile body 11.

The automobile body 11 is comprised of a plurality of automobile body panels 27 with apertures located therein and pockets located therein adapted to receive the modules 35 in any suitable spot in the front, back or side of the motor vehicle can be used for positioning of the pocket or compartment to house the solenoid-infrared sensor-valve-nozzle module 35. A receptacle 26 for example, adapted to receive one of the modules 35 shown underneath the hood of the automobile body 11. Pipe 18 or conduit terminates in a standard fitting for attaching the module 35 thereto. Similarly, the conduit 20 terminates at each of the modules 35 in a pipe fitting adapted for attachment to a mating fitting on each of the modules 35. Conduit 20 extends through the dashboard and up to the roof of the body 11 where it is joined at 33 to a nozzle spray system consisting of piping 34 having a series of spray modules or nozzles or light discharge heads 35, for example.

Figure 2:
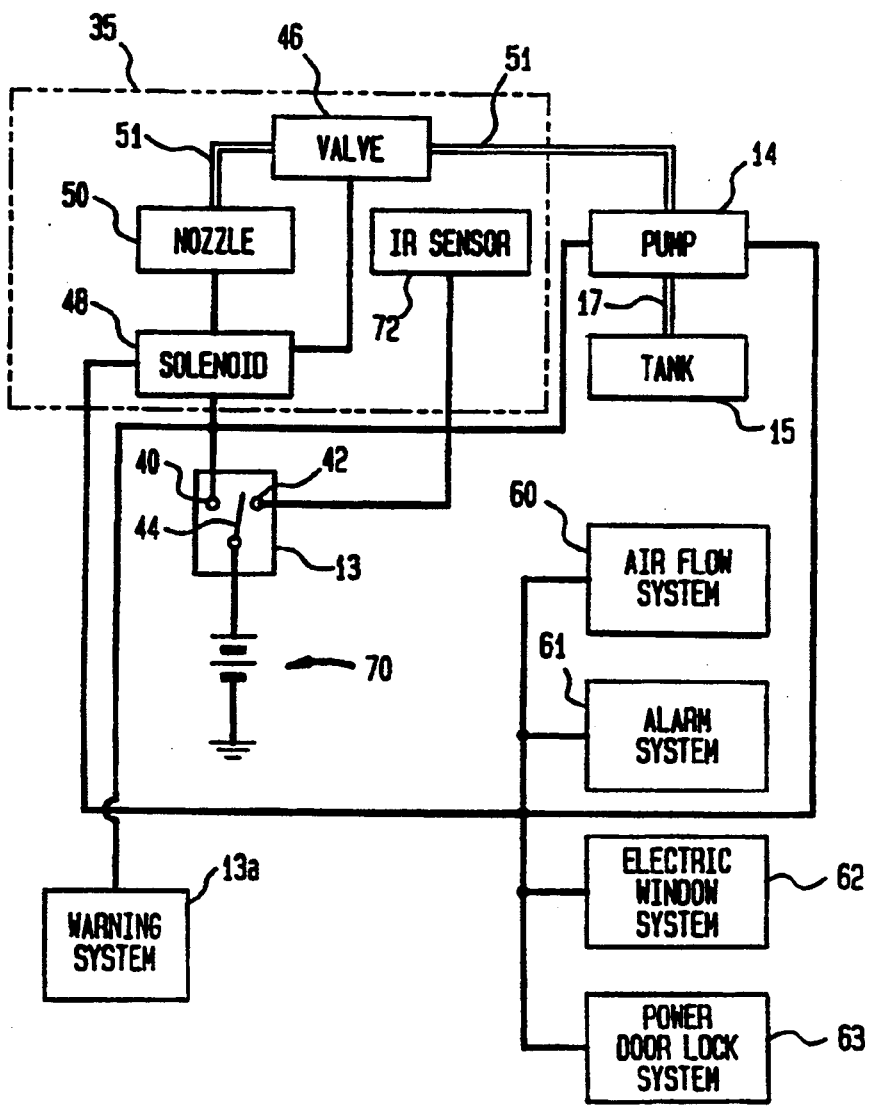
FIG. 2 is a block diagram which shows the relationship of the various features and components of the novel invention.

Pipe 20 is partly hidden or completely hidden by the body structure near the dashboard preferably extends up through the hollow front body post at either corner. The pipe 34 is fixed to the roof frame above the usual decorative material covering, and the modules 35 each contain nozzles or multiple openings usually flush with the roof and deliver a substance and/or material from the pressurized container 15 to the exterior of the automobile body 11. Thus, the conduit system simultaneously conveys both a discomfort causing substance and a dense smoke producing material via the conduits 20 and 24 to the nozzle modules 35 mounted in the pockets 26 of the structure of the automobile body 11 and underneath the panels 27. Referring to FIG. 2 the pressurized container 15 as shown as a tank 15 connected to the pump 14 schematically via a pipe 17. There is also shown the switch 13 which is a double pole variety having poles 40 and 42 with a contactor 44. When the switch is thrown so the contactor 44 makes contact with the pole 40 the pump 14 is directly actuated and energized causing fluid, or gas or both to be pumped from the pump 15 to the valve 46 for example. The valve 46 is normally closed and opened by actuation of a solenoid 48, for example. When the switch 13 is thrown such that the pole 40 is contacted this actuates the solenoid 48 thereby disengaging or opening the valve 46 and allowing material being pumped from the tank 16 by the pump 14 to pass through the valve 46 to a nozzle 50 via a conduit of type 51. In this mode of operation the occupant of the motor vehicle shown generally as 10 in FIG. 1 engages a carjacking defense system wherein a discomfort causing chemical as well as a smoke producing chemical is sprayed from the nozzle 50 at each place where a nozzle 50 is located about the vehicle. In this case a nozzle 50 is located within each of the modules 35 as shown in FIG. 1 and thereby emits noxious chemical and smoke completely around the vehicle in an non-selective and arbitrary manner.

When the pole 40 is contacted actuating the solenoid 48, this also overrides the air flow system 60, the electric window system 62 and the power door lock system 63. A standard off-the-shelf microprocessor may be used to effect the override and control these systems in a predetermined or programmed manner. Contacting and energizing the pole 40 accomplishes this override by connecting the power supply 70 via the solenoid to the control circuitry or a preset microprocessor adapted to control systems 60, 61, 62, and 63.

On some occasions the driver of the motor vehicle 10 in FIG. 1 may sense a potential danger or threat of a carjacking but not an actual carjacking in progress and may simply desire to arm the carjacking defense system to react in the event a human body approaches within a certain range or close vicinity of or touches the vehicle. The system enables this function by means of an infrared sensor 72 interconnected to the power supply 70 via another pole 42 of the switch 13 and by pre-adjusting the sensor threshold, a standard procedure in the thermal sensor art.

The infrared sensor 72 acts as a normally open electrical switch which does not close except upon sensing infrared radiation or heat above a certain preset threshold. When the sensor 72 senses the presence of infrared heat above a certain threshold it acts as an electrical switch allowing current to flow from the power supply 70 to the switch 13 and through the sensor 72 the solenoid 48. Upon actuation of the solenoid 48 the normally closed valve 46 is actuated along with the overriding and actuation of the circuitry for the air flow systems 60, the alarm system 61, the electric window system 62 and the power door lock system 63.

The solenoid 48, valve 46, nozzle 50, infrared sensor 72 as well as the piping 51 are standard off the shelf items and comprise and make up the module 35.

Figure 3:
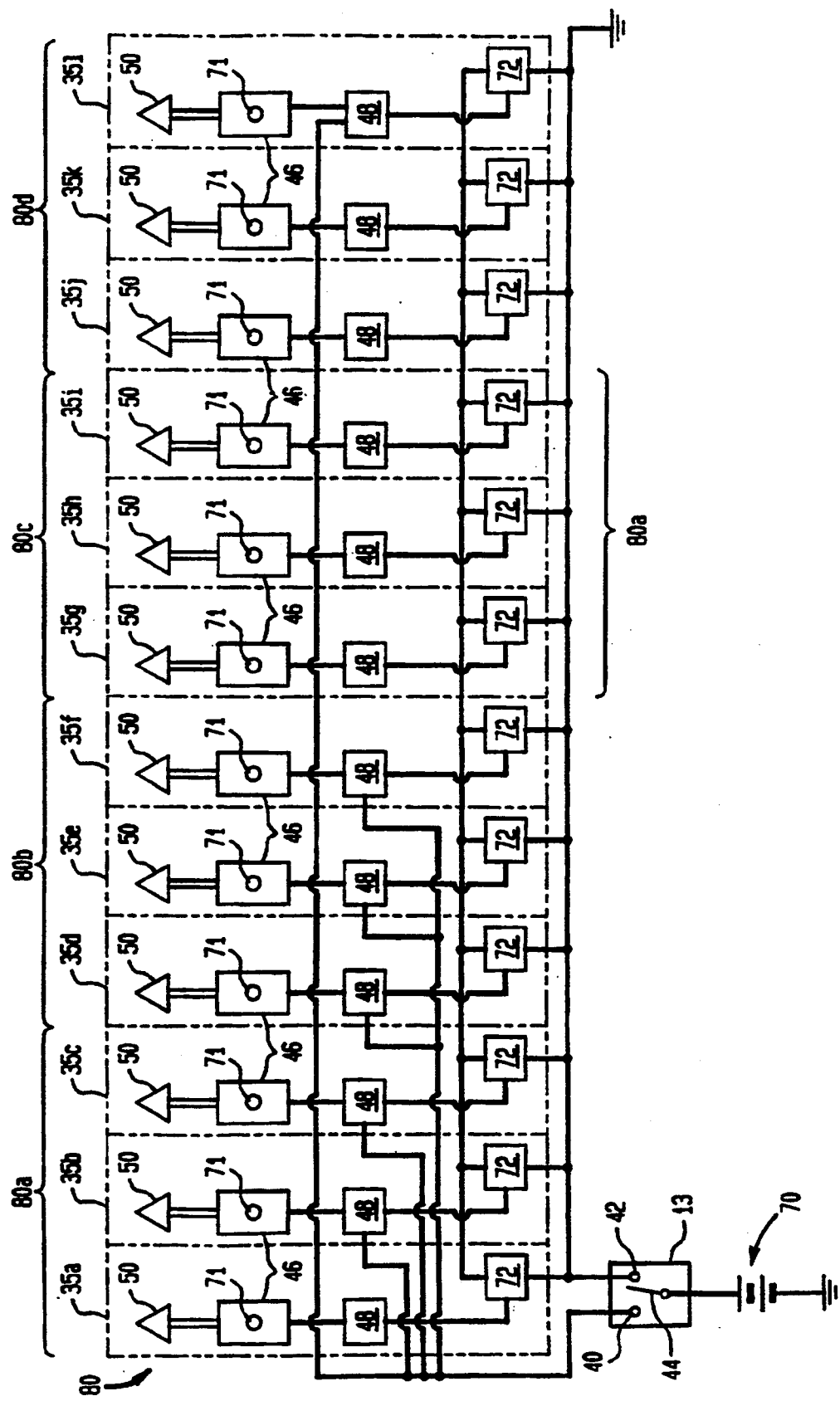
FIG. 3 is a block diagram which schematically shows the relationship of components of the novel system including an electrical control system for a battery of infrared heat sensors, controlling solenoids, solenoid controlled valves, and their connection to a double pole, dual position switch.

The selectively discharging the contents of the tank 15 a plurality of modules 35 are interconnected in the manner shown in FIG. 3. For example, as shown in FIG. 3 a battery 80 of interconnected modules 35 is connected to the double pole switch 13. The valve 46 is shown in the module 35 A connected to the nozzle 50 solenoid 48 which in turn is controlled in one mode by the infrared sensor 72 as previously shown in FIG. 2. Thus, upon a throw of the contactor 44 of the switch 13 to the pole 42 the infrared sensor 72 is engaged. The engaged infrared sensor 72 controls the solenoid 48 and actuates, when its threshold is reached, the solenoid 48 which in turn opens the valve 46. An input aperture 71 is shown with the valve 46. The sensor aperture 71 interconnects the valve 46 to the pump 14 shown in FIG. 2 which in turn is connected to the tank 15.

In the preferred embodiment a bank 80a comprising modules 35a, 35b and 35c is disclosed at the front of the vehicle, for example. In addition, a bank 80b comprised of modules 35d, 35e and 35f are disposed at the rear of the vehicle for example. A bank 80c comprised of the modules 35g, 35g and 35i is disposed on the left side of the vehicle and another bank 80d comprised of modules 35j, 35k and 35l is disposed on the other side, the right side for example of the vehicle 10. If the contactor 44 is thrown, it contacts the pole 40. All of the modules bypass the infrared sensors 72 in the module and are directly actuated causing the material to spray from the nozzles 50 in each of the modules 35a through 35l located in the banks 80a, 80b, 80c, and 80d.

From the foregoing description and specification, it will be appreciated by those skilled in the art that numerous modifications and variations may be made to the invention without departing from the spirit and scope thereof as set out in the following claims.

I claim:

1. A carjacking defense apparatus for use in a motor vehicle having an existing electrical vehicle horn, an existing electric window system, an existing sealable interior air flow control system, side windows, front and rear bumpers, a firewall, and a horn system comprising: A motor vehicle, a pressurized tank located inside said vehicle, filled with a discomfort causing substance and a dense smoke producing material, a valve, a nozzle, a valve distribution nozzle means located inside said vehicle for selectively releasing said substance and said material from said tank through said valve to said nozzle; a warning means communicating outside said vehicle, a solenoid operatively connected for actuating said valve distribution nozzle means connected to said valve for distributing said substance and said material outside; an infrared heat sensor means located adjacent each valve distribution nozzle means connected to said solenoid and adapted to actuate said solenoid upon detecting a change in ambient infrared heat; an audible high decibel alarm operatively connected for actuation by said solenoid; switching means activating said warning system and selectively energizing said solenoid to open said valve, causing release of said substance and material from said tank and simultaneously activating said audible alarm; said switching means located inside said motor vehicle and selectively operative in a first position automatically overriding the interior air flow control system of said vehicle sealing same from outside ambient air and simultaneously overriding all electrical windows raising all electrically powered windows and simultaneously overriding and activating said alarm system and simultaneously energizing a pump means for pumping said substance and said material thru said valve means to said nozzle means, said switching means selectively operative in a second position to activate said infrared heat sensor, said infrared heat sensor operative at its threshold to energize said solenoid whereby said solenoid switches power to said pump and opens the valve adjacent the nozzle releasing said substance and said material in the vicinity of the actuated infrared heat sensor.

2. The device of claim 1, wherein the smoke produced by said material is dense, opaque, and capable of irritating the olfactory system, mucous membranes, the respiratory system, or the eyes of the carjacker.

3. The device of claim 1, wherein said substance is non-toxic and non-corrosive.

4. The device of claim 1, wherein said substance comprises an indelible dyestuff.

5. The device of claim 1 further comprising at least one module, at least one valve, one nozzle and one solenoid connected together in and disposed in said module, said module adapted with pipefittings and the module mounted in the body of the motor vehicle.

6. The device of claim 1, wherein said distribution nozzle means comprises a plurality of nozzles located about the outside of said motor vehicle and a plurality of infrared heat sensors concealed about the outside of said motor vehicle.

7. The device of claim 5 further comprising electrical connectors inside said module and wherein at least one infrared heat sensor is located adjacent the nozzle and electrically connected to electrical connectors inside said module.

8. The device of claim 7 wherein said nozzles and said infrared heat sensors are arrayed along each side of said motor vehicle above and below the windows.

9. The device of claim 8 wherein a plurality of said nozzles and another plurality of said infrared heat sensors are arrayed along the front and rear bumpers of said motor vehicle.

* * * * *